UNITED STATES PATENT OFFICE.

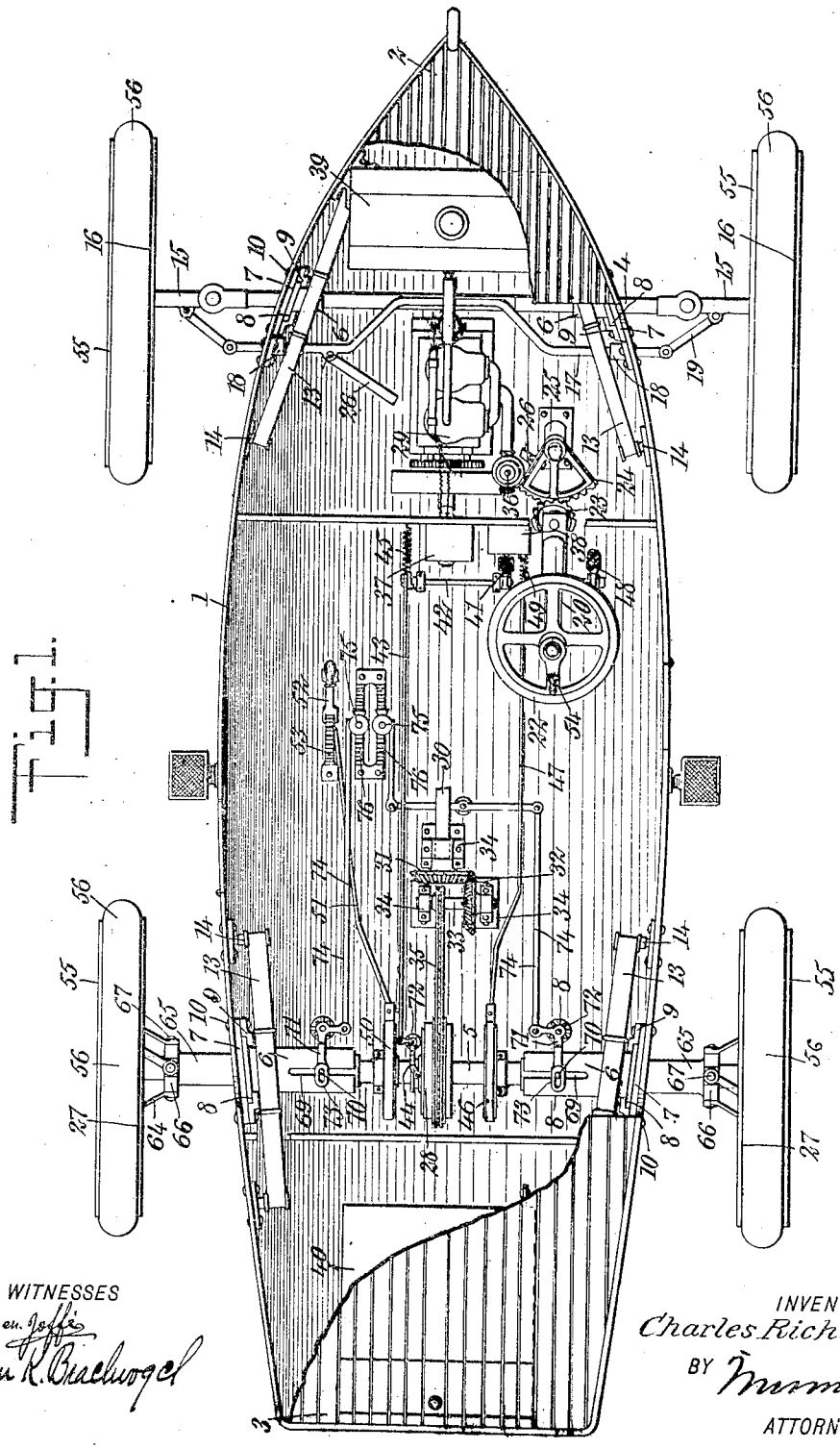

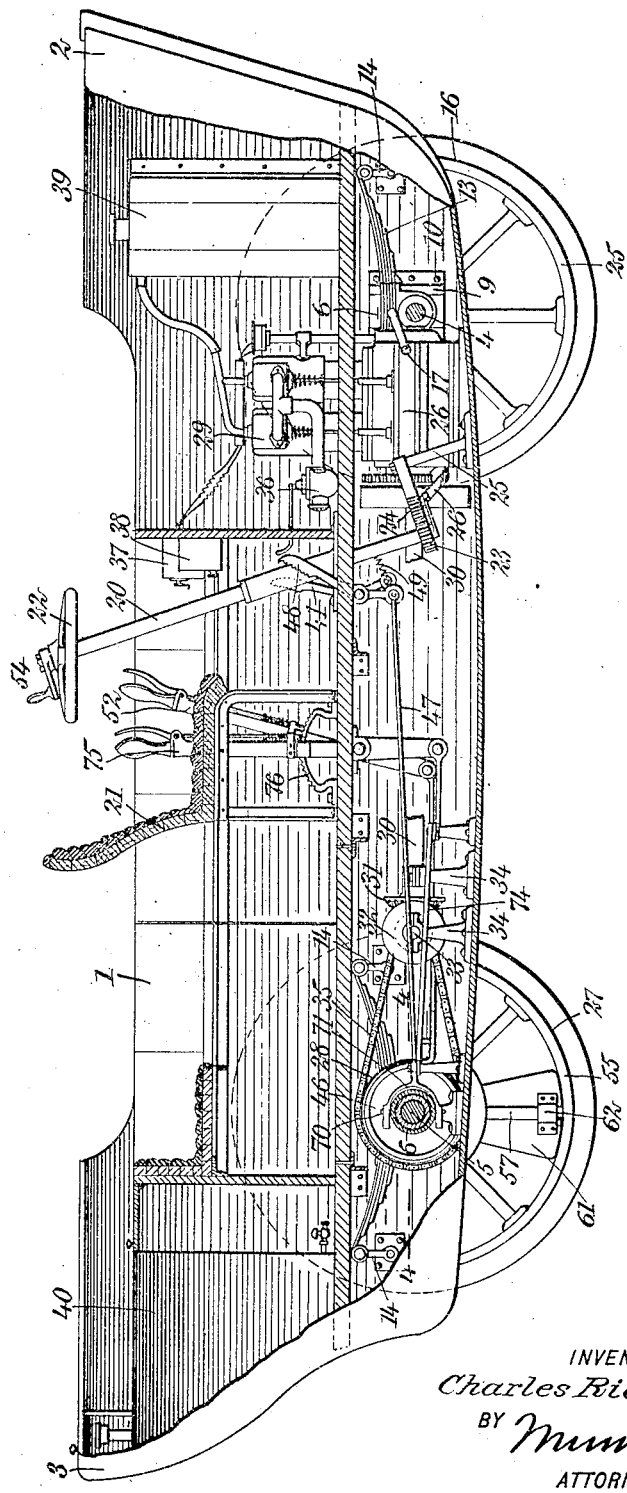

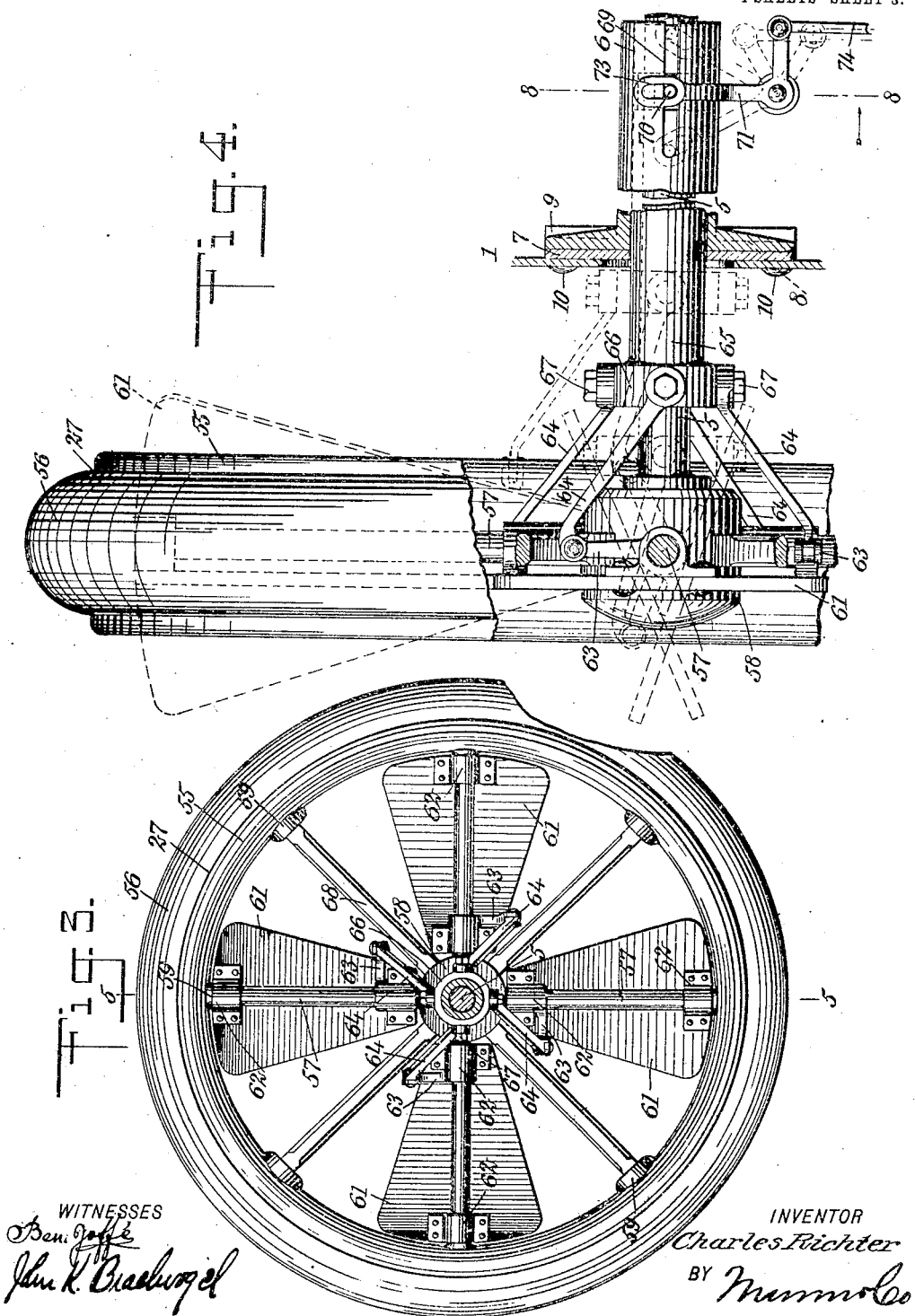

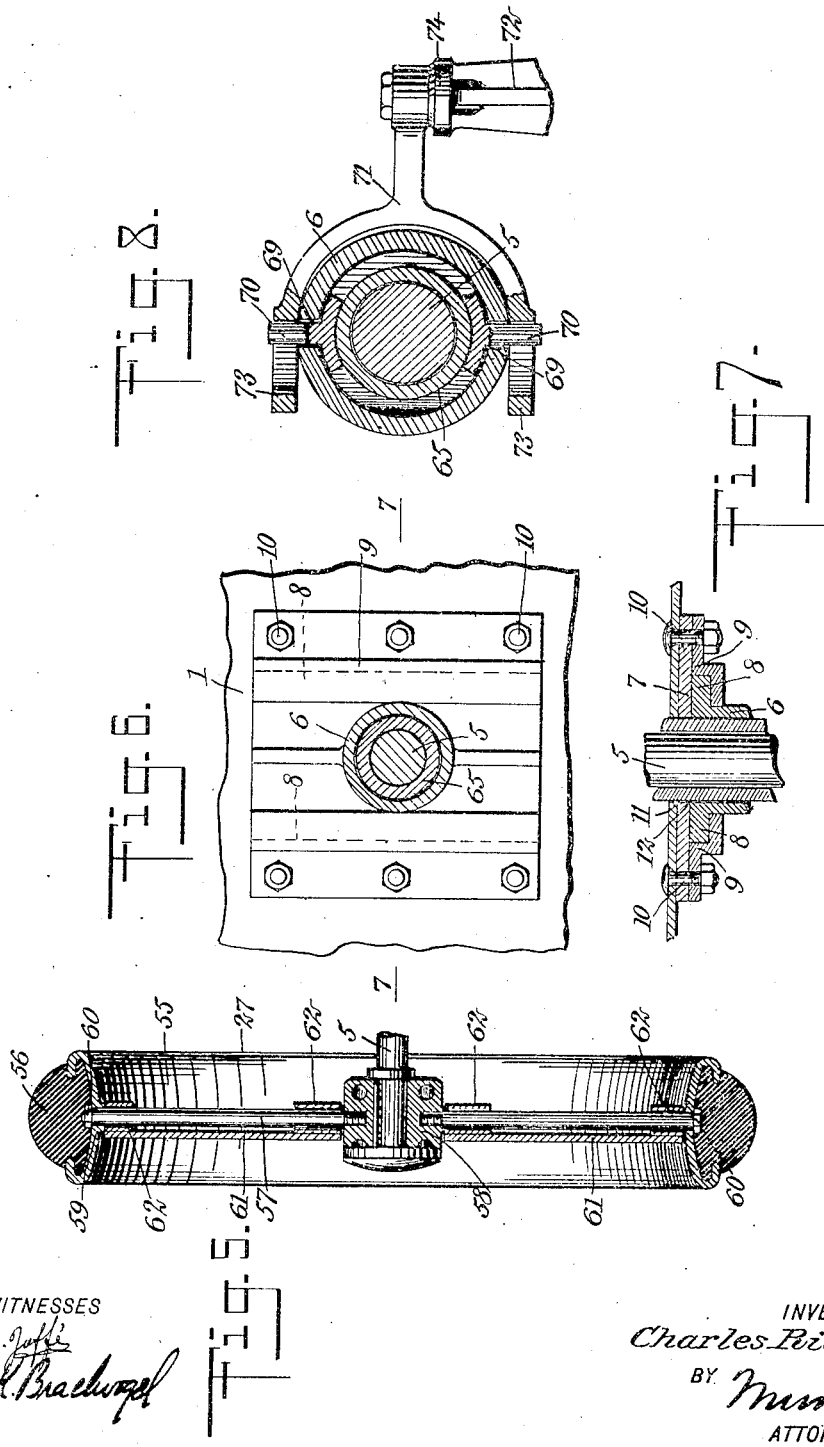

CHARLES RICHTER, OF TAMPA, FLORIDA, ASSIGNOR TO HIMSELF AND LOUIS FROMER, OF TAMPA, FLORIDA.

SELF-PROPELLED VEHICLE.

No. 904,998.

Specification of Letters Patent.

Patented Nov. 24, 1908.

Application filed December 26, 1907. Serial No. 407,998.

*To all whom it may concern:*

Be it known that I, CHARLES RICHTER, a subject of the King of Hungary, and a resident of Tampa, in the county of Hillsboro and State of Florida, have invented a new and Improved Self-Propelled Vehicle, of which the following is a full, clear, and exact description.

This invention relates to self-propelled vehicles, and more particularly to that class of vehicles usually characterized as automobiles.

An object of the invention is to provide a self-propelled vehicle which is adapted to travel on land and water.

A further object of the invention is to provide a vehicle of the class described adapted to travel on land and on water, and having means for propelling the vehicle on land and on water.

A still further object of the invention is to provide a vehicle having a body consisting of a buoyant hull having driving wheels for propelling the vehicle on land, and having means for adapting the driving wheels to propel the vehicle on water.

Another object of the invention is to provide a vehicle having a buoyant hull carried upon wheeled axles and mounted upon springs, the hull being so arranged that it has a certain amount of play with respect to the axles, which pass through the hull in water-tight bearings.

The invention consists in the construction and combination of parts to be more fully described hereinafter and particularly set forth in the claims.

Reference is to be had to the accompanying drawings forming a part of this specification, in which similar characters of reference indicate corresponding parts in all the views, and in which—

Figure 1 is a plan view of the vehicle, showing parts broken away; Fig. 2 is a longitudinal section of the device showing parts broken away; Fig. 3 is an enlarged side elevation of one of the driving wheels showing the driving axle in cross-section; Fig. 4 is an enlarged transverse section on the line 4—4 of Fig. 2; Fig. 5 is a transverse section on the line 5—5 of Fig. 3; Fig. 6 is an enlarged transverse section of one of the axles of the vehicle showing a portion of the hull in elevation; Fig. 7 is a transverse section on the line 7—7 of Fig. 6; and Fig. 8 is an enlarged transverse section on the line 8—8 of Fig. 4.

Before proceeding to a more detailed explanation of my invention, it should be understood that as the vehicle is adapted to travel on water as well as on land, the body of the vehicle is preferably fashioned to constitute a hull similar to the hulls of boats or launches of the usual type. The body or hull is supported upon axles carried by wheels which permit the vehicle to run on land. The device is propelled by a motor which may be of any preferred or common type, for example, an internal combustion engine. It will be understood that I do not desire to limit myself in the form of engine used, to any one type, so that if desired, I can use a motor of any convenient design. The front wheels of the vehicle, as in the ordinary automobile, constitute the land steering wheels, that is the wheels which are employed to guide or direct the vehicle when it is traveling on land. The rear wheels constitute the driving wheels for propelling the vehicle upon land. I provide paddle or propeller blades upon the driving wheels, which can be so adjusted when the vehicle is floating upon the water, to again serve as driving wheels and propel the vehicle upon the water. When the vehicle is floating upon the surface of the water and is advancing upon the same it can be steered to a certain extent by twisting the land steering wheels in one direction or the other. To facilitate the steering of the device I provide means for controlling the propeller blades upon the driving wheels so that these can be independently adjusted to alter the advancing effect of the wheels independently. Consequently, by causing one propeller wheel to act more effectually than the other the device can be directed in one direction or the other.

Referring more particularly to the drawings, 1 represents the body or the hull of the vehicle. The hull preferably has the shape of a boat hull, with the bow 2 adjacent to the front wheels, and the stern 3 adjacent to the rear wheels of the vehicle. The hull may be fashioned from any suitable material such as sheet metal, wood or the like. The front axle 4, and the rear axle 5, are arranged in openings in the sides of the hull and extend laterally beyond the same. The axles are journaled in bearings 6 which are slidably arranged upon plates 7 mounted at the inner sides of the hull. The bearings 6 have laterally disposed flanges 8 engaging under-cut guides 9 held in position upon the plate 7 by means of bolts 10 which pass through to the outer sides of the hull. The openings 11 of the hull, and 12 of the plate are elongated to permit the movement of the axles with respect to the hull. Springs 13 are secured to the axle and have the ends fastened by means of spring brackets 14 to the sides of the hull. Thus the hull is resiliently carried by the axles and is permitted a certain limited up-and-down movement in jolting over rough roads and the like. The springs of course, resiliently resist the movements of the hull, and when these do occur, the bearings 6 slide with respect to the hull within the guides 9.

The front axle 4 at the ends has pivoted axle spindles 15, which carry the front or steering wheels 16. A steering rod 17 is arranged transversely of the hull and is arranged slidably in bushings 18 mounted at the sides of the hull. The rod 17 extends laterally beyond the hull and has the extremities connected by means of links 19 to the axle spindles 15. A steering pillar 20 is arranged within the hull in front of the driver's seat 21. The steering pillar carries the usual hand steering wheel 22, and at the lower end, has a gear 23 which meshes with a segment 24 mounted upon a shaft 25 in any preferred or common manner. The shaft 25 is preferably arranged in a bearing carried at the bottom of the hull. The segment is operatively connected by means of a member 26 with the steering rod 17 and moves the latter longitudinally in one direction or the other when the hand steering wheel 22 is correspondingly operated. In this way the front wheels 16 are turned to guide the vehicle upon land.

The rear or driving axle 5 has driving wheels 27 rigidly mounted at the ends thereof, and within the hull has a clutch 28 which preferably includes the change-speed gearing. The motor 29 is arranged near the bow of the hull and has the crank or driving shaft 30 arranged longitudinally of the hull. The driving shaft 30, at the end, has a bevel gear 31 in mesh with a bevel gear 32 carried by a spindle 33. The shaft 30 and the spindle 33 are journaled in suitable bearings 34. The spindle 33 is operatively connected with the clutch 28 by means of sprockets and a chain 35. As shown in the drawings, the motor consists of an internal combustion engine of the usual type, having a carbureter 36, a spark coil 37, an oiling device 38, and a cooler 39. The tank 40 for supplying the motor with fuel is preferably arranged within the hull near the stern. The clutch and change-speed gear are controlled by the pedal 41 mounted upon a shaft 42 and through the latter controlling a rod 43. The latter is secured to a lever 44 which operates the clutch and change-speed gear. A spring 45 resists the movement of the rod 43.

At one side of the clutch, upon the axle 5, is arranged an emergency brake 46 connected by means of a rod 47, to a pedal 48. The rod 47 is controlled by a spring 49 which normally holds the brake inoperative. At the other side of the clutch is an ordinary brake 50 connected by means of a rod 51 with a hand lever 52. The hand lever 52 which is of the usual form, employed in automobiles has a notched segment 53 which serves to hold the lever in a plurality of positions. The throttle and the spark are controlled by a lever 54 mounted upon the steering pillar 20 and connected with the motor in any preferred or common form.

I prefer to employ metal wheels having flanged rims 55 which have mounted thereupon solid tires 56. It will be understood that the wheel rim may be of any suitable form and if so desired, pneumatic or other tires may be used. Each of the driving wheels 27 has four spokes 57 preferably of round cross-section and secured to the hubs 58 in suitable openings which are threaded to receive the correspondingly threaded spoke ends. The outer ends of the spokes 57 are arranged in sockets 59 of the rim and are held in position by nuts 60. Upon each of the spokes 57 is arranged a propeller or paddle blade 61 having bearings 62, which are revolubly mounted upon the spokes. The blades can be arranged in the plane of the wheel or can be so disposed that they are at substantially right angles or at any other angle with the plane of the wheel. The bearings 62 adjacent to the hub of the wheel has a rigid arm 63 operatively connected by means of a link 64 with a sleeve 65 slidable upon the axle and extending through the bearing 6 into the hull. Links 64 are secured to the sleeve at a laterally extended collar 66, by means of screws or bolts 67. If so desired, the driving wheels may have auxiliary spokes 68 between each pair of adjacent spokes 57.

The bearing sleeves 6 which extend inwardly from the sides of the hull have slots 69 through which project studs 70 rigidly carried by the sleeves 65. Bell crank levers 71 are movably carried by brackets 72 arranged upon the bottom of the hull. Each of the bell crank levers has one of the arms bifurcated and extending at opposite sides of the bearing sleeves 6. The ends of the bifurcated bell crank lever arms are formed into slotted heads 73, each of which engages one of the studs 70 carried by the sleeves 65. By means of rods 74 the levers 71 are connected with hand levers 75. The latter have notched segments 76 which serve to hold the levers 75 in a plurality of positions.

When a sleeve 65 is moved longitudinally of the driving axle, the propeller blades of the corresponding wheel are moved in one direction or the other. Thus, by means of the hand levers 75 and the connecting rod 74 the sleeve can be actuated to adjust the propeller blades. When the propeller blades are arranged in planes at right-angles to the plane of each wheel they are in the most effective position for propelling the vehicle upon the water. It will be understood that the action of the paddle wheel is that of the ordinary paddle wheel used in vessels, and that when the hull is in the water it is submerged to a point substantially such that the upper portions of the driving wheels are above water. By shifting the propeller blades on one or the other of the driving wheels the latter can be used to steer the device. It is obvious that if the propeller blades on one of the steering wheels are at right angles to the plane of the vehicle, and the propeller blades on the other driving wheel lie in the plane of the wheel, the vehicle will be turned in one direction owing to the difference in the effect produced by the two wheels.

Having thus described my invention I claim as new, and desire to secure by Letters Patent:

1. A self propelled vehicle adapted to travel on land or on water and having a buoyant body, a common wheel adapted for propelling the vehicle on land or on the water and arranged to rotate in one plane only, and means for adjusting said wheel whereby the latter is adapted for steering the vehicle on water.

2. A self-propelled vehicle adapted to travel on land or on water and having a buoyant body, driving wheels for land travel, means for converting said wheels into propellers for water travel, and means for adjusting said first means and maintaining the same in any desired adjustment whereby said wheels are adapted for steering the vehicle on water.

3. A self-propelled vehicle adapted to travel on land or on water, and having a body constituting a buoyant hull, wheels for propelling the vehicle on land, mechanism for driving said wheels, means for adapting said wheels to propel the vehicle on water, and means for adjusting said first means, whereby said wheels are adapted for steering the vehicle on water said first means being adapted to be maintained in any desired adjustment.

4. A self-propelled vehicle adapted to travel on land or on water, and having a body constituting a buoyant water-tight hull, wheels for propelling the vehicle on land, further wheels for steering the vehicle on land, means for controlling said further wheels, mechanism for driving said propelling wheels, means for adapting said propelling wheels to propel the vehicle on water, and means for adjusting said first means whereby said propelling wheels are adapted for steering the vehicle on water, said first means being adapted to be maintained in any desired adjustment.

5. A self-propelled vehicle having a body formed to float, wheels supporting said body, certain of said wheels being driving wheels, and means for actuating said driving wheels, said driving wheels having adjustable propeller blades adapted to be positioned and maintained in any desired adjustment whereby said driving wheels are adapted for steering the vehicle on water.

6. A self-propelled vehicle having a body constituting a buoyant hull, wheels supporting said body, one of said wheels being a driving wheel, means for actuating said driving wheel, said driving wheel having a propeller blade adapted to be arranged in the plane of the wheel and adjustable into a plane at an angle with the plane of the wheel, and means for adjusting said blade and holding it in any desired adjustment.

7. A self-propelled vehicle having a body constituting a buoyant hull, wheels supporting said body, one of said wheels being a driving wheel, another of said wheels being a land-steering wheel, means for actuating said driving wheel, means for controlling said steering wheel, said driving wheel having a propeller blade adapted to be arranged in the plane of the wheel and adjustable into a position out of the plane of the wheel, means for adjusting said blade, and means for holding said blade in a plurality of positions.

8. In a self-propelled vehicle, a wheel having a plurality of movable blades, means for arranging said blades in a plurality of positions at angles with the plane of the wheel, and means for holding said blades in a plurality of positions.

9. In a self-propelled vehicle, a body constituting a hull, an axle arranged transversely of said hull and having the ends projecting beyond the sides of said hull, wheels mounted upon said projecting ends, said wheels having spokes, and blades pivotally carried by said spokes, sleeves slidably arranged upon said axle and extending from within said hull toward said wheels, said blades having rigid arms, links connecting said arms and said sleeves, means for sliding said sleeves on said axle, and means for holding said sleeves in a plurality of positions.

In testimony whereof I have signed my name to this specification in the presence of two subscribing witnesses.

CHARLES RICHTER.

Witnesses:
ADOLFINE FROMER,
M. HENRY COHEN.